(12) United States Patent
Frenger et al.

(10) Patent No.: US 12,237,880 B2
(45) Date of Patent: Feb. 25, 2025

(54) ARRANGEMENT AND METHOD PERFORMED THEREIN FOR HANDLING COMMUNICATION

(71) Applicant: Telefonaktiebolaget LM Ericsson (publ), Stockholm (SE)

(72) Inventors: Pål Frenger, Linköping (SE); Erik G. Larsson, Linköping (SE); Emil Björnson, Hägersten (SE); Jan Hederen, Linghem (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 428 days.

(21) Appl. No.: 17/639,717

(22) PCT Filed: Sep. 13, 2019

(86) PCT No.: PCT/SE2019/050868
§ 371 (c)(1),
(2) Date: Mar. 2, 2022

(87) PCT Pub. No.: WO2021/049987
PCT Pub. Date: Mar. 18, 2021

(65) Prior Publication Data
US 2022/0294496 A1    Sep. 15, 2022

(51) Int. Cl.
*H04B 7/0408*    (2017.01)
*H04B 7/06*    (2006.01)
*H04W 16/28*    (2009.01)

(52) U.S. Cl.
CPC ......... *H04B 7/0408* (2013.01); *H04B 7/0617* (2013.01); *H04W 16/28* (2013.01)

(58) Field of Classification Search
CPC .... H04B 7/0408; H04B 7/0617; H04W 16/28
USPC .......................................................... 370/329
See application file for complete search history.

(56) References Cited

U.S. PATENT DOCUMENTS

| | | | |
|---|---|---|---|
| 10,601,130 B2* | 3/2020 | Driscoll | H01Q 25/007 |
| 11,038,563 B2* | 6/2021 | Christoffersson | H04L 25/0226 |
| 11,791,930 B2* | 10/2023 | Chen | H04W 72/54 |
| | | | 370/329 |

(Continued)

FOREIGN PATENT DOCUMENTS

| WO | 2010144170 A2 | 12/2010 |
|---|---|---|
| WO | 2018103897 A1 | 6/2018 |

(Continued)

OTHER PUBLICATIONS

EPO Communication with Supplementary European Search Report dated Apr. 21, 2023 for patent Application No. 19945276.4, consisting of 9-pages.

(Continued)

*Primary Examiner* — Anthony Mejia
(74) *Attorney, Agent, or Firm* — Weisberg I.P. Law, P.A.

(57) ABSTRACT

Embodiments herein disclose, e.g., an arrangement for handling radio signals, wherein the arrangement has an elongated housing. The elongated housing has at least one antenna processing unit (APU) and at least two groups of antenna elements, wherein each group of antenna elements includes antenna elements and a beamforming unit that generates one or more beams. The at least one APU is connected to both the groups of antenna elements.

20 Claims, 10 Drawing Sheets

(56) References Cited

U.S. PATENT DOCUMENTS

| | | | | |
|---|---|---|---|---|
| 2002/0021246 | A1* | 2/2002 | Martek | H01Q 25/00 |
| | | | | 342/373 |
| 2007/0205955 | A1* | 9/2007 | Korisch | H01Q 21/24 |
| | | | | 343/797 |
| 2011/0299623 | A1* | 12/2011 | Wang | H04B 7/0617 |
| | | | | 375/295 |
| 2016/0128023 | A1 | 5/2016 | Gustavsson et al. | |
| 2018/0034166 | A1 | 2/2018 | Hinman | |
| 2018/0375550 | A1* | 12/2018 | Zhou | H04B 7/0667 |
| 2019/0252763 | A1 | 8/2019 | Vermes et al. | |
| 2019/0356367 | A1* | 11/2019 | Sun | H04B 7/0634 |
| 2020/0169306 | A1* | 5/2020 | Kim | H04B 7/0691 |
| 2023/0188180 | A1* | 6/2023 | Nilsson | H04B 7/024 |
| | | | | 370/329 |

FOREIGN PATENT DOCUMENTS

| | | |
|---|---|---|
| WO | 2019101290 A1 | 5/2019 |
| WO | 2020078537 A1 | 4/2020 |
| WO | 2020130902 A1 | 6/2020 |

OTHER PUBLICATIONS

International Search Report and Written Opinion dated Jul. 17, 2020 for International Application No. PCT/SE2019/050868 filed Sep. 13, 2019, consisting of 13-pages.

Giovanni Interdonato; Signal Processing Aspects of Cell-Free Massive MIMO; Linkoping Studies in Science and Technology Licentiate Thesis No. 1817; Sep. 21, 2018, consisting of 49-pages.

Giovanni Interdonato et al.; Ubiquitous Cell-Free Massive MIMO Communications; J Wireless Com Network, 2019, consisting of 19-pages.

Jesus Rodriguezsanchez et al.; Decentralized Massive MIMO Processing Exploring Daisy-chain Architecture and Recursive Algorithms; IEEE Transactions on Signal Processing, May 8, 2019, consisting of 12-pages.

Emil Bjornson et al.; Making Cell-Free Massive MIMO Competitive with MMSE Processing and Centralized Implementation; IEEE Transactions on Wireless Communications; Mar. 25, 2019, consisting of 13-pages.

* cited by examiner

ARRANGEMENT AND METHOD PERFORMED THEREIN FOR HANDLING COMMUNICATION

CROSS-REFERENCE TO RELATED APPLICATION

This application is a Submission Under 35 U.S.C. § 371 for U.S. National Stage Patent Application of International Application Number: PCT/SE2019/050868, filed Sep. 13, 2019 entitled "ARRANGEMENT AND METHOD PERFORMED THEREIN FOR HANDLING COMMUNICATION," the entirety of which is incorporated herein by reference.

TECHNICAL FIELD

Embodiments herein relate to an arrangement and a method performed therein. In particular, embodiments herein relate to handling communication in a communication network.

BACKGROUND

In a typical wireless communication network, user equipment (UE), also known as wireless communication devices, mobile stations, stations (STA) and/or wireless devices, communicate via a Radio Access Network (RAN) with one or more core networks (CN). The RAN covers a geographical area which is divided into service areas or cell areas, with each service area or cell area being served by radio network nodes such as an access node e.g. a Wi-Fi access point or a radio base station (RBS), which in some networks may also be called, for example, a NodeB, a gNodeB, or an eNodeB. The service area or cell area is a geographical area where radio coverage is provided by the radio network node. The radio network node operates on radio frequencies to communicate over an air interface with the UEs within range of the radio network node. The radio network node communicates over a downlink (DL) to the UE and the UE communicates over an uplink (UL) to the radio network node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipment. In a forum known as the Third Generation Partnership Project (3GPP), telecommunications suppliers propose and agree upon standards for present and future generation networks and UTRAN specifically, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3GPP and this work continues in the coming 3GPP releases, such as 4G and 5G networks such as New Radio (NR). The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

With the emerging 5G technologies such as new radio (NR), the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

Figure 1:
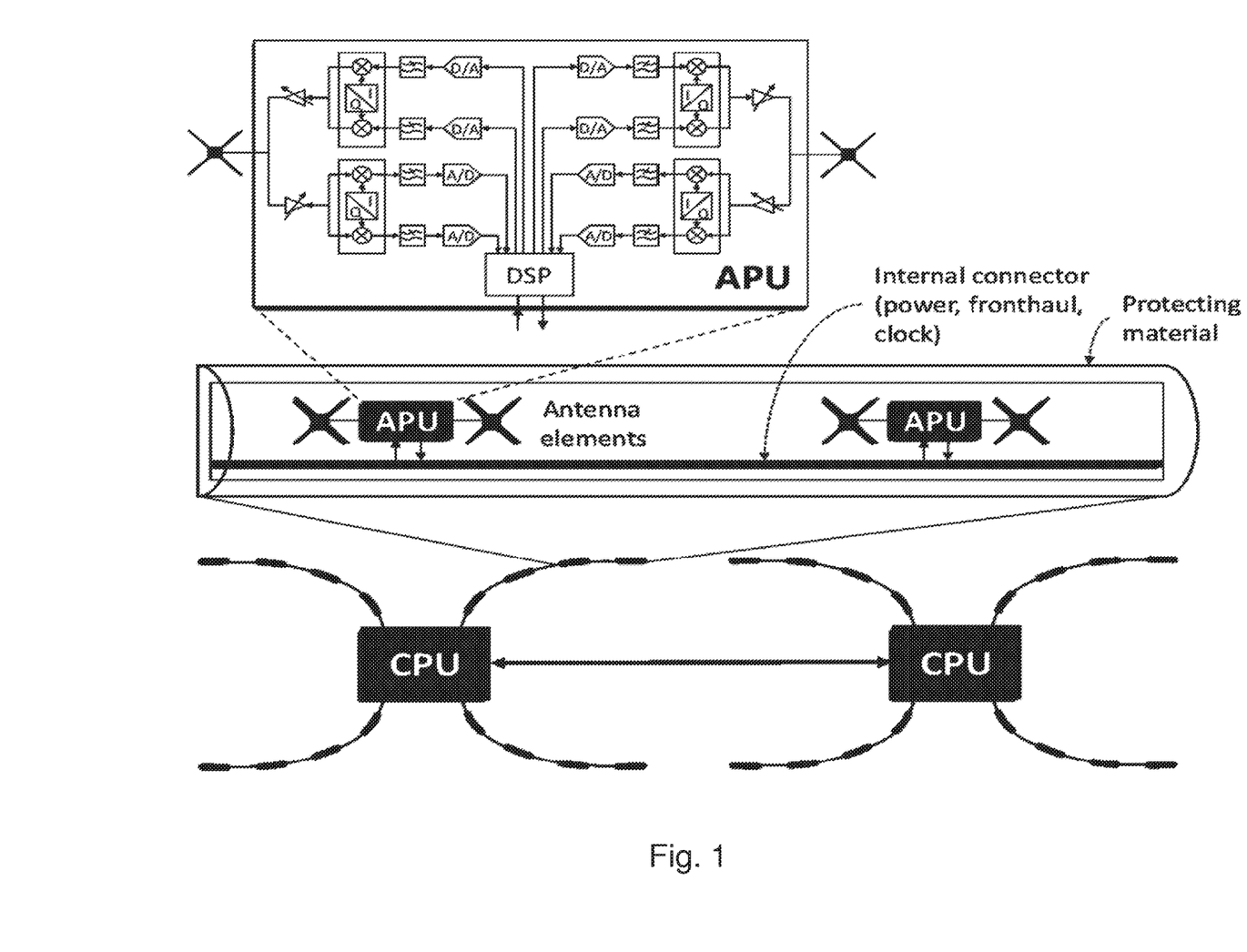
FIG. 1 shows an example of a radio stripe system.

Radio stripes, see WO2018103897A1, is an implementation of distributed massive multiple input multiple output (MIMO) where small access points, aka radio units, such as antennas, are placed on a stripe, with all electronics and fronthaul integrated into that stripe. Massive MIMO is an extension of MIMO, which essentially groups together antennas at the transmitter and receiver to provide better throughput and better spectrum efficiency, FIG. 1 shows an example radio stripe system wherein central processing units (CPU) are connected to radio stripes comprising arrangements with antenna processing units (APU) and antenna elements which may also be referred to as antennas. Each APU comprises e.g. a digital signal processor (DSP) and analog to digital converters (A/D), digital to analog converters (D/A) and in-phase signal component/quadrature phase signal component (I/Q) entities.

As shown in FIG. 1, antenna elements and the associated antenna processing units (APU) are serially located inside the same cable, which also provides synchronization, data transfer, and power supply via a shared bus. Specifically, the actual access points consist of antenna elements and circuit-mounted chips, including power amplifiers, phase shifters, filters, modulators, A/D and D/A converters, inside the protective casing of a cable or a stripe. Each radio stripe is then connected to one or multiple CPUs. Since the total number of distributed antenna elements is assumed to be large, the transmit power of each antenna element can be very low, resulting in low heat-dissipation, small volume and weight, and low cost. Small low-gain antennas are used. For example, if the carrier frequency is 5.2 GHz then the antenna size is 2.8 cm, thus, the antennas and processing hardware can be easily fitted in a cable/stripe.

The receive/transmit processing of an antenna is performed locally i.e. right next to itself. On the transmitter side, each APU receives multiple streams of input data, e.g., one stream per UE, one UE with multiple streams, or some other UE-stream allocation, from the previous APU via the shared bus. In each antenna, the input data streams are scaled with a pre-calculated precoding vector and the sum-signal is transmitted over the radio channel to the receiver(s). By exploiting channel reciprocity, the precoding vector may be a function of the estimated uplink channels. For example, if the conjugate of the estimated uplink channel is used, maximum ratio (MR) precoding is obtained. This precoding requires no channel state information (CSI) sharing between the antennas.

On the receiver side, the received radio signal is multiplied with the combining vector previously calculated in the uplink pilot phase. The output gives data streams that are then combined with the data streams received from the shared bus and sent again on the shared bus to the next APU. The radio stripe system facilitates a flexible and cheap cell-free massive MIMO deployment.

The originally conceived processing for cell-free massive MIMO is "maximum-ratio" combination and precoding, which can be implemented in a distributed way, without having to send all the baseband data to the CPU. However, it is known that bringing all data to the CPU and performing more advanced "interference cancellation" signal processing, e.g., zero-forcing or Minimum Mean Square Error (MMSE) combining, can enormously increase performance and especially perform spatial multiplexing of terminals that are located close to one another geographically.

Bringing all data to the CPU is undesirable since the fronthaul capacity requirement grows rapidly with the number of APUs. Some distributed architecture is required. However, it is not clear how to implement a well-working distributed MMSE solutions, for example, with hundreds or thousands of APUs, since the fronthaul requirements simply do not scale.

A direct attempt to distribute the processing would be to group the APUs together and e.g., have them perform, pair-wisely, or triple-wisely, interference cancellation processing. The problem with this is that groups of APUs would not cooperate, and the effect of the interference cancellation would be rather marginal. Quite large groups of APUs would be required for this to work.

Figure 2:
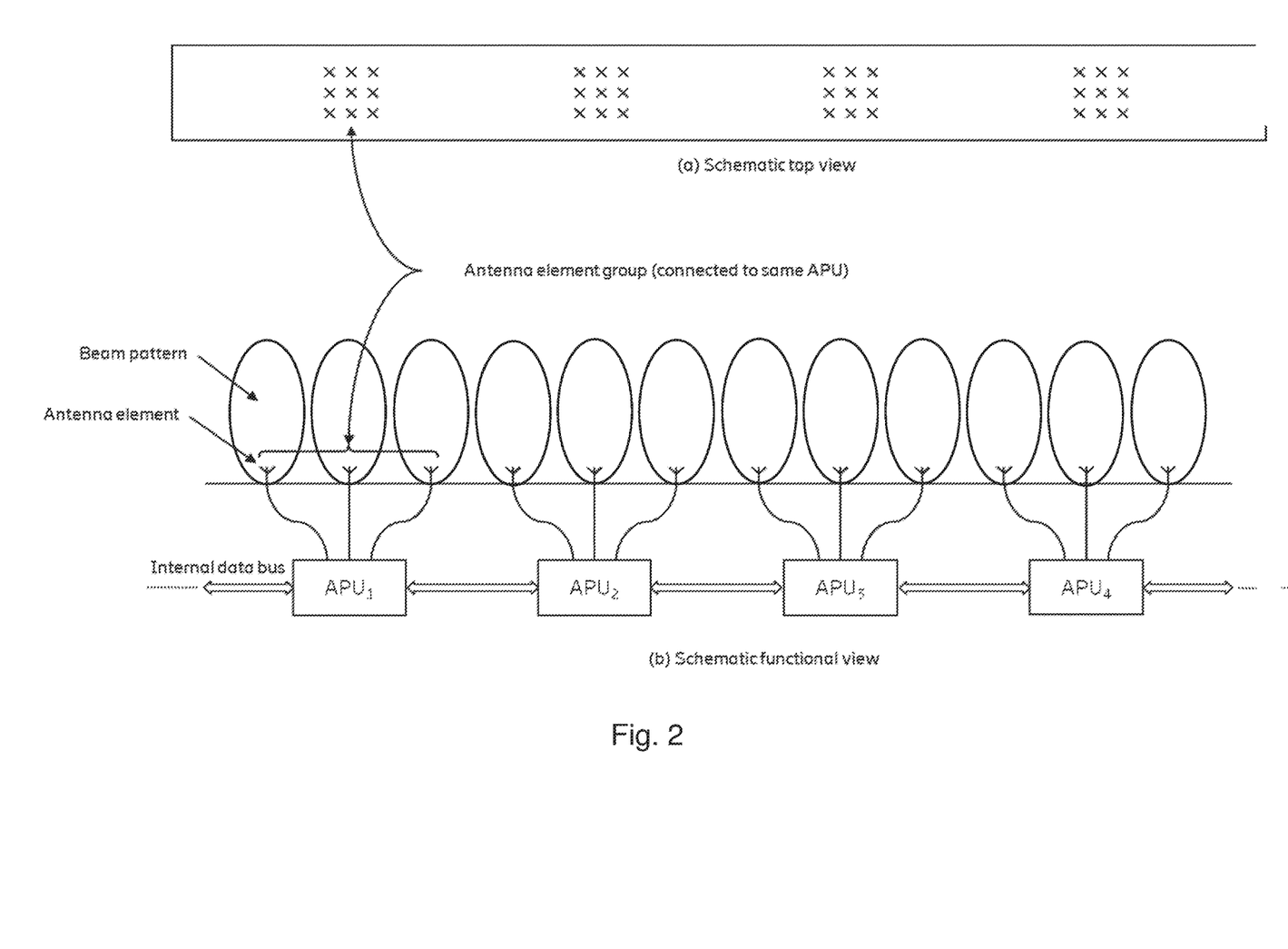
FIG. 2 shows a state-of-the-art distributed interference suppression arrangement.

FIG. 2 is an illustration of a state-of-the art distributed interference suppression arrangement. To obtain some degree of interference suppression without performing centralized determination of beamforming related parameters, e.g. pre-coding weights and/or power control coefficients, one APU may be connected to multiple adjacent antenna elements or antenna element groups.

One problem with the prior art arrangement depicted in FIG. 2 is that $APU_1$, for example, can easily implement a state-of-the-art interference cancellation method, e.g. MMSE. However, since $APU_1$ does not cooperate phase-coherently with $APU_2$, $APU_3$, . . . , if there are two simultaneous UEs, say, located such that their signals impinge from the north-east direction, using geographic map terminology to define directions, the antennas connected to $APU_1$ are too closely spaced for $APU_1$ to be able to spatially resolve these two signals. Hence, interference suppression capabilities of $APU_1$, or any other APU for that matter, are very limited and this limitation will have a negative impact on the end performance.

SUMMARY

An object of embodiments herein is to improve performance of the wireless communication network in an efficient manner.

The object may be achieved by providing an arrangement for handling radio signals. The arrangement comprises an elongated housing, such as a cable or a stripe of e.g. plastic or rubber, comprising at least one APU and at least two groups of antenna elements. Each group of antenna elements comprises antenna elements and a beamforming unit that generates one or more beams; and wherein the at least one antenna processing unit is connected to both the groups of antenna elements.

The object may be achieved by providing a method performed by an arrangement with an elongated housing for handling radio signals. The arrangement receives or transmits radio signals over at least two antenna elements of at least two groups of antenna elements, wherein each group of antenna elements comprises antenna elements and a beamforming unit that generates one or more beams and the at least two antenna elements are connected to an APU.

It is furthermore provided herein a computer program product comprising instructions, which, when executed on at least one processor, cause the at least one processor to carry out the method above, as performed by the arrangement. It is additionally provided herein a computer-readable storage medium, having stored thereon a computer program product comprising instructions which, when executed on at least one processor, cause the at least one processor to carry out the method above, as performed by the arrangement.

Embodiments herein may achieve better multiplexing gain and spatial resolution with less hardware resources, less fronthaul, and lower power consumption. These improvements can be further translated to an overall cost reduction, since less hardware resources are required to achieve similar performance. Since the beams used by a single APU may point, e.g., in similar directions, a much higher spatial resolution, i.e. ability to resolve closely spaced terminals, is achieved.

Embodiments herein thus provide an improved performance of the wireless communication network in an efficient manner.

BRIEF DESCRIPTION OF THE DRAWINGS

The embodiments herein will now be described and explained in more detail in relation to the enclosed drawings, in which.

DETAILED DESCRIPTION

Figure 3:
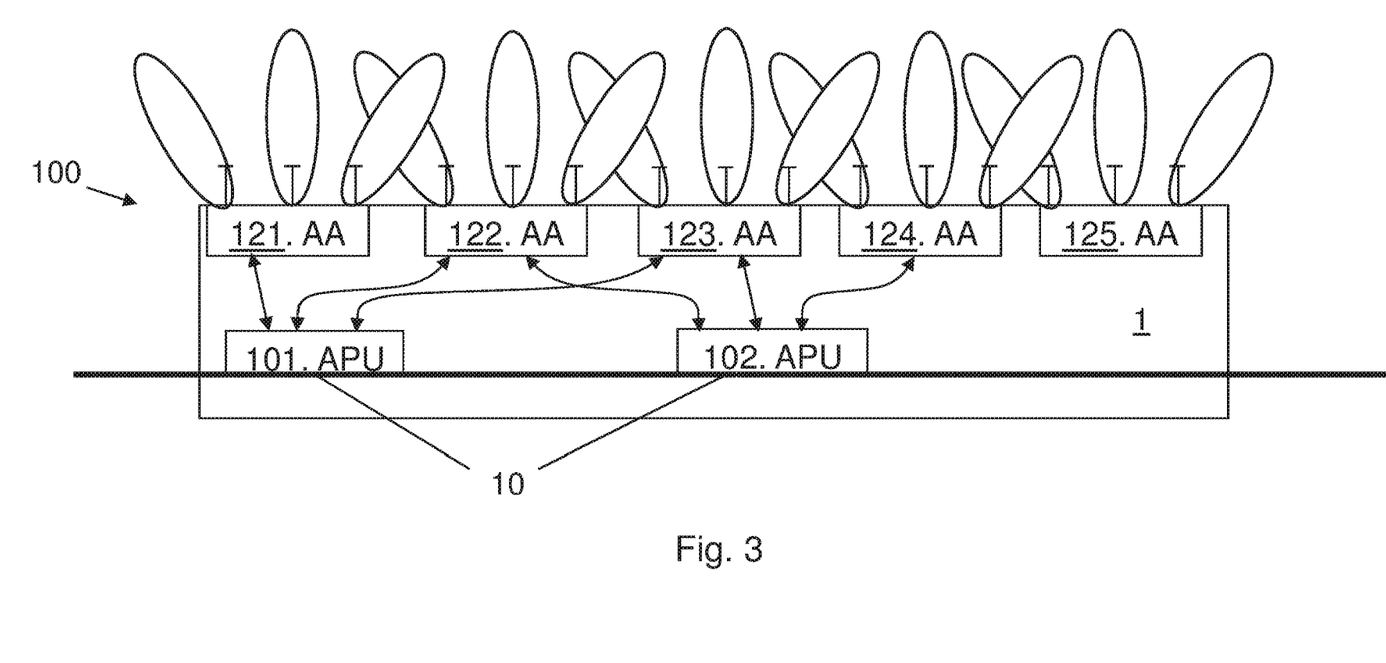
FIG. 3 shows a schematic overview depicting an arrangement according to embodiments herein.

FIG. 3 discloses an arrangement 100 for handling radio signals, wherein the arrangement comprises an elongated housing 1 such as a stripe or cable in plastic, rubber or similar. The elongated housing 1 comprises at least one antenna processing unit (APU) 10, such as a first processing unit 101 or a second processing unit 102, and at least two groups of antenna elements in an antenna arrangement (AA), such as a first group of antenna elements 121, a second group of antenna elements 122, a third group of antenna elements 123, a fourth group of antenna elements 124, a fifth group of antenna elements 125. Each group of antenna elements comprises antenna elements and a beamforming unit that generates one or more beams. The first processing unit 101 is connected to the first group 121, the second group 122 and the third group 123 of antenna elements.

In FIG. 3, each antenna arrangement or group of antenna elements has three antenna elements, with three different main lobe directions, here denoted west, north and east. It should be noted that the group of antenna elements may have any number of antenna elements per group and that antenna elements in a group of antenna elements may also be arranged in a two-dimensional structure, see FIG. 2, top view.

In this example each antenna processing unit, such as the first processing unit 101 in turn connects to three antenna beams from three neighboring groups of antenna elements such as the first, second and third group. E.g., every third APU connects to west-pointing antenna beams, every next third APU connects to north-pointing antennas, and every next third APU connects to east-pointing antennas. Thus, the at least one antenna processing unit such as the first processing unit 101 is connected to a first antenna element of the first group 121 of antenna elements and a second antenna element of the second group 122 of antenna elements, and wherein the first and second two antenna elements have, via respective beamforming units, a reception and/or transmission direction within a similar degree interval set by a threshold, e.g., 5 degrees. Within each group of antenna elements, there may be antenna elements configured to transmit and/or receive different beams with different main-lobe directions and/or polarizations. The beamforming unit of each group of antenna elements may comprise a butler matrix, a radio frequency lens, and/or a directing arrangement configured to direct beams. The antenna processing unit is configured to perform interference cancellation processing locally at the antenna processing unit. I.e., since the APU is connected to antenna elements of different groups, i.e. each group is spatially separated a distance, this enables an improved interference cancellation. That is, the antenna elements are not too closely spaced. The different groups may be separated a set distance e.g. above a threshold, e.g., 1 dm.

The APUs are connected to one another through a radio-stripe fronthaul, e.g. an internal data bus, in the conventional manner. The effect of the arrangement is that all APUs process signals that substantially arrive from (or are radiating towards) the east; all APUs process northbound signals; and so forth. The benefit is that each APU now achieves better spatial resolution, larger interference suppression capabilities, and higher signal gain. Thus, the antenna processing units are connected to beams pointing in a similar direction but originating from different antenna element groups.

In the example embodiment depicted in FIG. 3, the actual antennas or antenna elements in each group of antenna elements point in, substantially, the same direction, but a beamforming unit such as a Butler matrix, which is a phase-shifter network, is connected between the antenna elements and the beamforming unit's input signals from the connected APUs. This has the effect that the input from the first APU corresponds to a substantially west-pointing beam, the input from the second APU points to a substantially north-pointing beam, and so forth. The Butler matrix generates a "grid of beams" (GOB), and at least two beams pointing in a similar direction, but originating from different groups of antenna elements, are controlled by the same APU.

Antennas, also referred to as antenna elements, are thus herein grouped into "antenna element groups", also referred to herein as "group of antenna elements". Within each antenna element group, there are different beams with e.g. different main-lobe directions, where they either point physically into different directions or a phase shifter network is used to create beams with predetermined directions, and/or polarizations. Each antenna processing unit is connected to multiple antenna element groups, and all interference cancellation processing may be performed locally at each APU. Since the beams used by a single APU point in similar directions, a much higher spatial resolution, ability to resolve closely spaced terminals, is achieved. The arrangement thus comprises the APU, e.g. one or more processors, configured to perform the method herein. The APU comprises, e.g., one or more DSPs, A/Ds, D/As and I/Q entities. The arrangement as such may comprise a memory, wherein the memory comprises one or more units to be used to store data on, such as groups, interferences cancellation procedures, and/or applications to perform the method disclosed herein when being executed, and similar.

The method according to the embodiments described below for the arrangement may be implemented by means of e.g. a computer program product 1080 or a computer program, comprising instructions, i.e., software code portions, which, when executed on at least one processor, cause the at least one processor to carry out the actions described herein, as performed by the arrangement. The computer program 1080 may be stored on a computer-readable storage medium 1090, e.g. a universal serial bus (USB) stick, disc or similar. The computer-readable storage medium 1090, having stored thereon the computer program product, may comprise the instructions which, when executed on at least one processor, cause the at least one processor to carry out the actions described herein, as performed by the arrangement. In some embodiments, the computer-readable storage medium may be a non-transitory computer-readable storage medium.

Embodiments herein provide a better multiplexing gain and spatial resolution with less hardware resources, less fronthaul, and lower power consumption. These improvements can be further translated to an overall cost reduction since less hardware resources are required to achieve similar performance.

Figure 4:
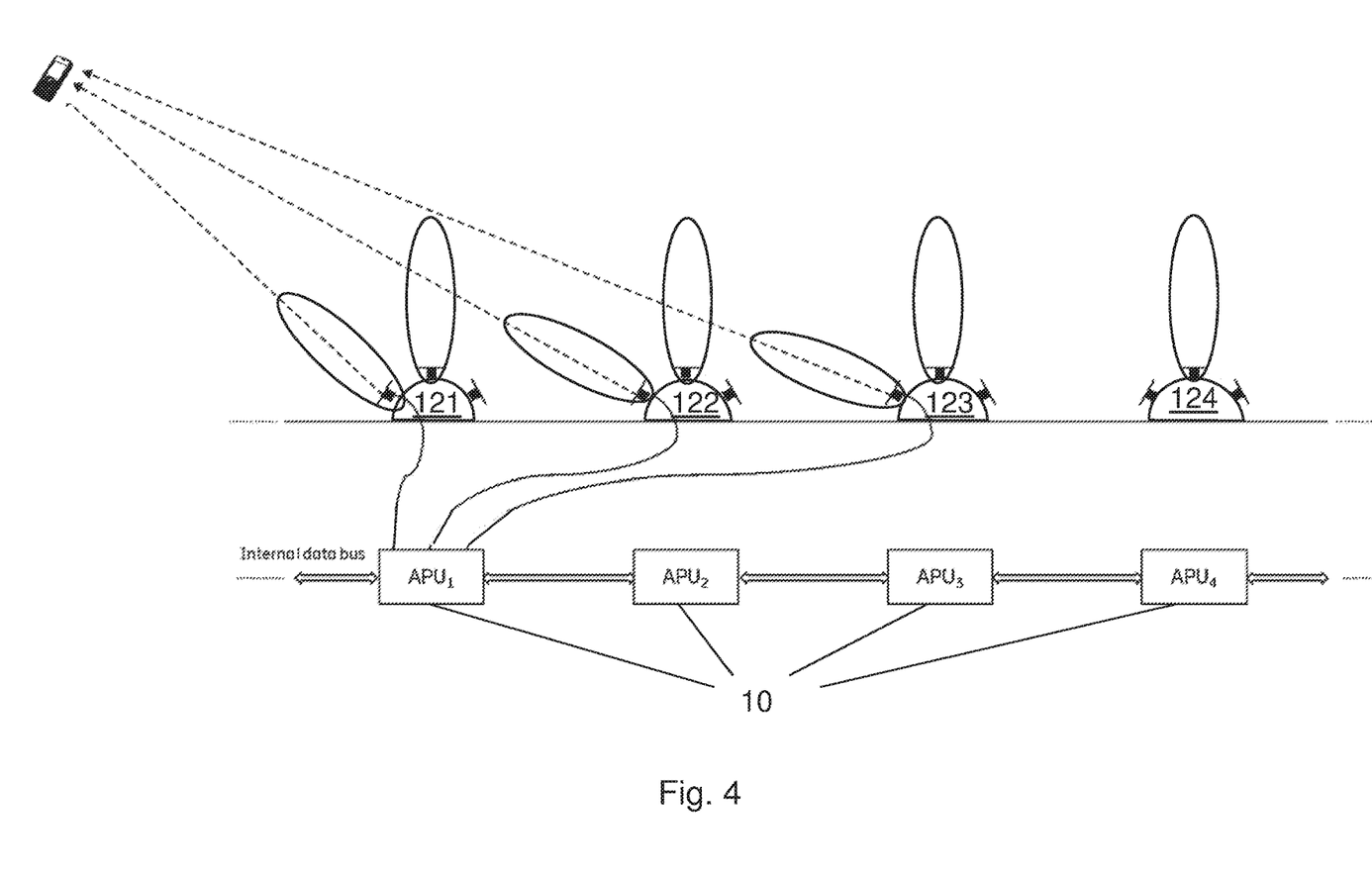
FIG. 4 shows a schematic overview depicting an arrangement according to embodiments herein.

The groups of antenna elements may comprise or consist of physical antenna elements that are arranged in a manner that results in multiple beams pointing in different spatial directions, as shown in Error Reference source not found. FIG. 4. In FIG. 4 only the connections for the first APU, denoted as $APU_1$, are depicted. Other APUs are connected to similarly pointing beams in an arrangement analogous to that depicted in FIG. 3. Also shown in FIG. 4 is a UE served using $APU_1$ and its' associated beams. Note that FIG. 4 is not drawn to scale and the angular difference in signal components reaching the UE may be much smaller in a real deployment.

Groups of antenna elements comprise different antenna elements in an arrangement resulting in different beam directions for different antenna elements using a beamforming unit. Each APU in the elongated housing 1 is connected to at least two antenna elements in two different antenna element groups having, e.g., a similar spatial beam pointing direction, i.e. within a similar degree interval set by the threshold.

Figure 5:
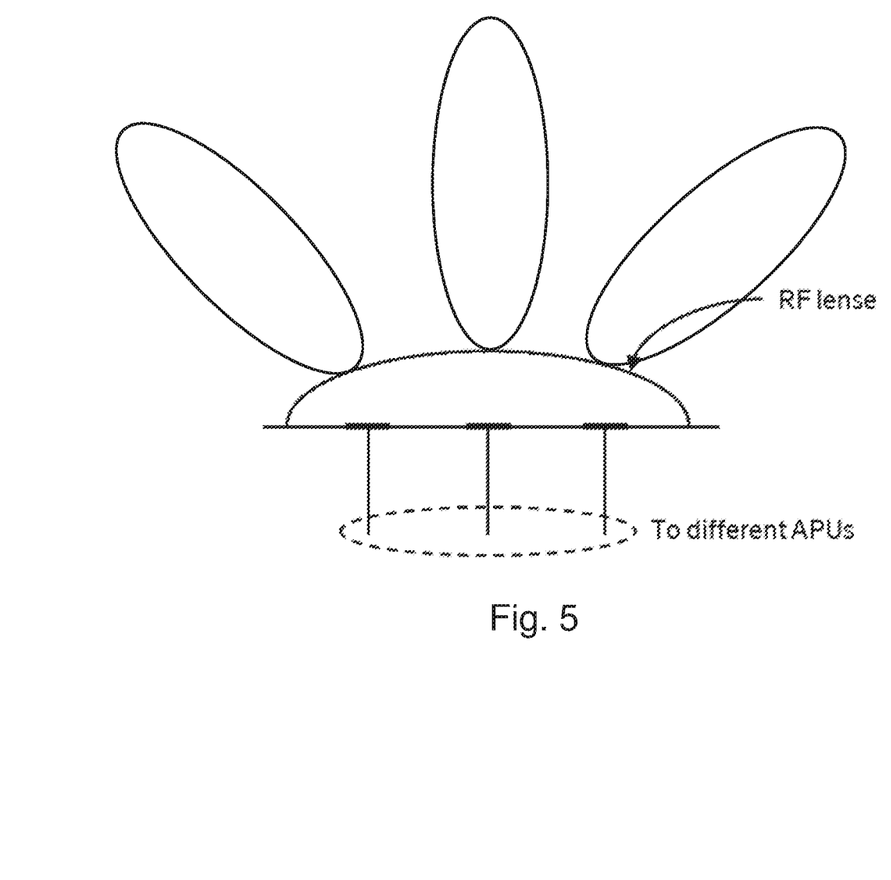
FIG. 5 shows a schematic overview depicting an arrangement according to embodiments herein.

In some embodiments, a radio frequency (RF) lens may be used to achieve an effect similar to that obtained with the use of a Butler matrix. The RF lens may be a unit out of glass or similar for forming the beam(s), see FIG. 5. FIG. 5 shows an antenna arrangement connected to different APUs and using an RF lens to direct beams over/from the antenna elements. Thus, it is herein disclosed an antenna arrangement for handling radio signals, wherein the antenna arrangement comprises a number of antenna elements wherein each antenna element is configured to communicate with a respective APU of a number of separated APUs. The antenna arrangement may comprise a butler matrix, a radio frequency lens, and/or one or more directing arrangements configured to direct beams.

FIG. 5 is an example arrangement used in some embodiments herein. In some embodiments, the mappings of antenna elements to APUs can be reconfigured over time and/or frequency. This might require a hardware switch when the word "antenna" refers to a physical antenna, while a software switch might be used when the word "antenna" refers to a virtual antenna created using, e.g., a Butler matrix.

In some embodiments the Butler matrices coefficients may be controlled by the APU or by a CPU (See FIG. 1) based on spatial channel measurements, e.g., angle of arrival, angle of departure, etc., e.g. to optimize the pointing directions of beams serving a certain UE. In some embodiments the individual antenna elements in a group of antenna elements can be physically re-directed, re-configured, or re-tuned for same purpose, e.g. by physically moving the antenna elements.

Figure 6:
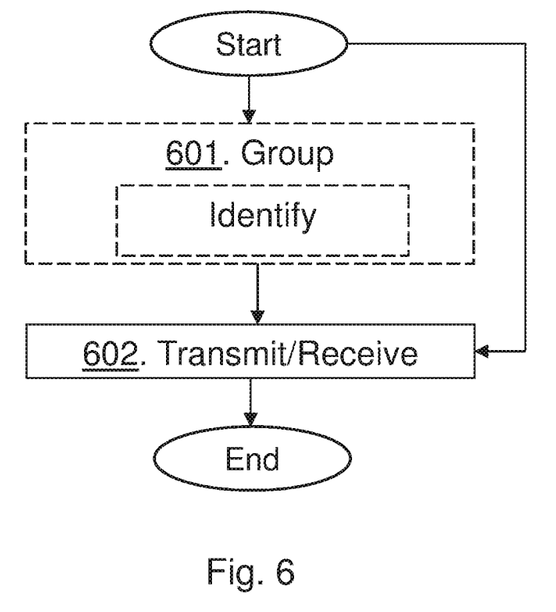
FIG. 6 shows a schematic overview depicting a method according to embodiments herein.

The method actions performed by the arrangement comprising the elongated housing for handling radio signals according to embodiments will now be described with reference to a flowchart depicted in FIG. 6. The actions do not have to be taken in the order stated below, but may be taken in any suitable order. Actions performed in some embodiments are marked with dashed boxes.

Action 601. The arrangement may group at least two antenna elements of different separated groups of antenna elements based on the communication direction of the antenna elements. It should be noted that grouping comprises identifying the at least two antenna elements. The communication direction may thus be similar for the grouped antenna elements, e.g. an absolute difference of the beam directions for a first beam of the first group and a second beam of the second group may be less than a threshold, e.g., 5 degrees. The grouping and, thus, the identifying may be hard coded, or dynamically selected.

Action 602. The arrangement receives or transmits radio signals over at least two antenna elements of at least two groups of antenna elements. Each group of antenna elements comprises antenna elements and a beamforming unit. The beamforming unit generates one or more beams and the at least two groups of antenna elements are connected to the APU. Within each group of antenna elements, there may be different beams, supported with different main-lobe directions and/or polarizations.

Thus, it is herein disclosed an arrangement in, e.g., a serially distributed MIMO system, such as the elongated housing 1, e.g. a radio stripe system or a radio stick system, where beams of antenna elements may have similar spatial pointing directions, differing within an interval of degrees, but originate from different groups of antenna elements that are controlled by the same antenna processing unit. The arrangement in a serially distributed MIMO system, where some APUs may be connected to at least two antenna elements supporting beams with similar spatial direction from two different spatially separated groups of antenna elements. The beams in a group of antenna elements may be generated using a butler matrix e.g. a phase shifter network, a radio frequency lens, or some other physical arrangement of antenna elements resulting in different pointing directions of beams originating from the same antenna element group.

Embodiments are applicable to any radio access technology (RAT) or multi-RAT systems, where the devices receive and/or transmit signals, e.g. data, such as New Radio (NR), Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

As will be readily understood by those familiar with communications design, that functions, means or circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing units discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware and/or program or application data. Other hardware, conventional and/or custom, may also be included. Designers of communications devices will appreciate the cost, performance, and maintenance trade-offs inherent in these design choices.

Figure 7:
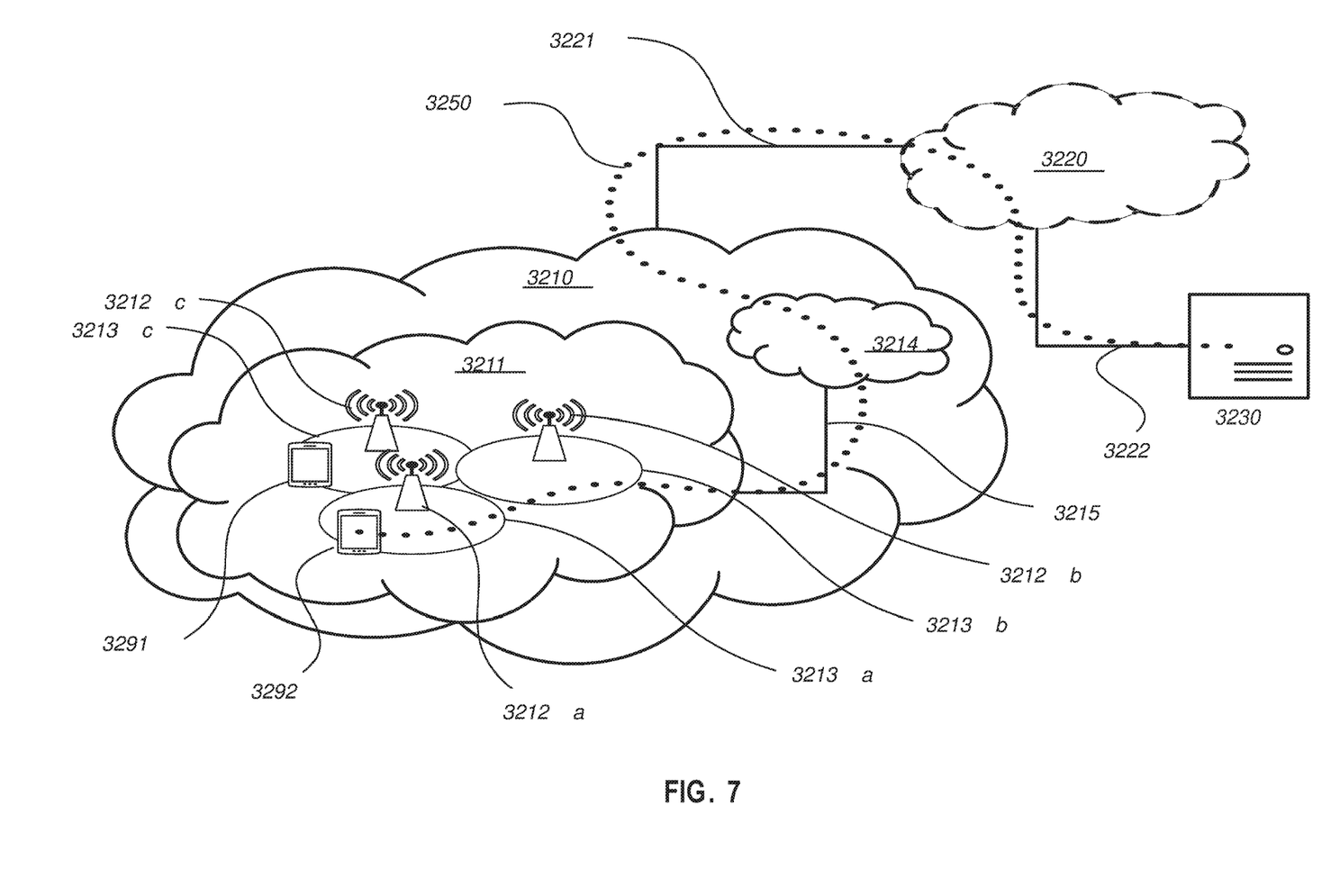
FIG. 7 is a telecommunication network connected via an intermediate network to a host computer in accordance with some embodiments.

FIG. 7 shows a Telecommunication network connected via an intermediate network to a host computer in accordance with some embodiments. Wth reference to FIG. 7, in accordance with an embodiment, a communication system includes telecommunication network 3210, such as a 3GPP-type cellular network, which comprises access network 3211, such as a radio access network, and core network 3214. Access network 3211 comprises a plurality of base stations 3212a, 3212b, 3212c, such as NBs, eNBs, gNBs or other types of wireless access points being examples of the radio network node 12 above, each defining a corresponding coverage area 3213a, 3213b, 3213c. Each base station 3212a, 3212b, 3212c is connectable to core network 3214 over a wired or wireless connection 3215. A first UE 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example being examples of the UE 10 above, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 7 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Figure 8:
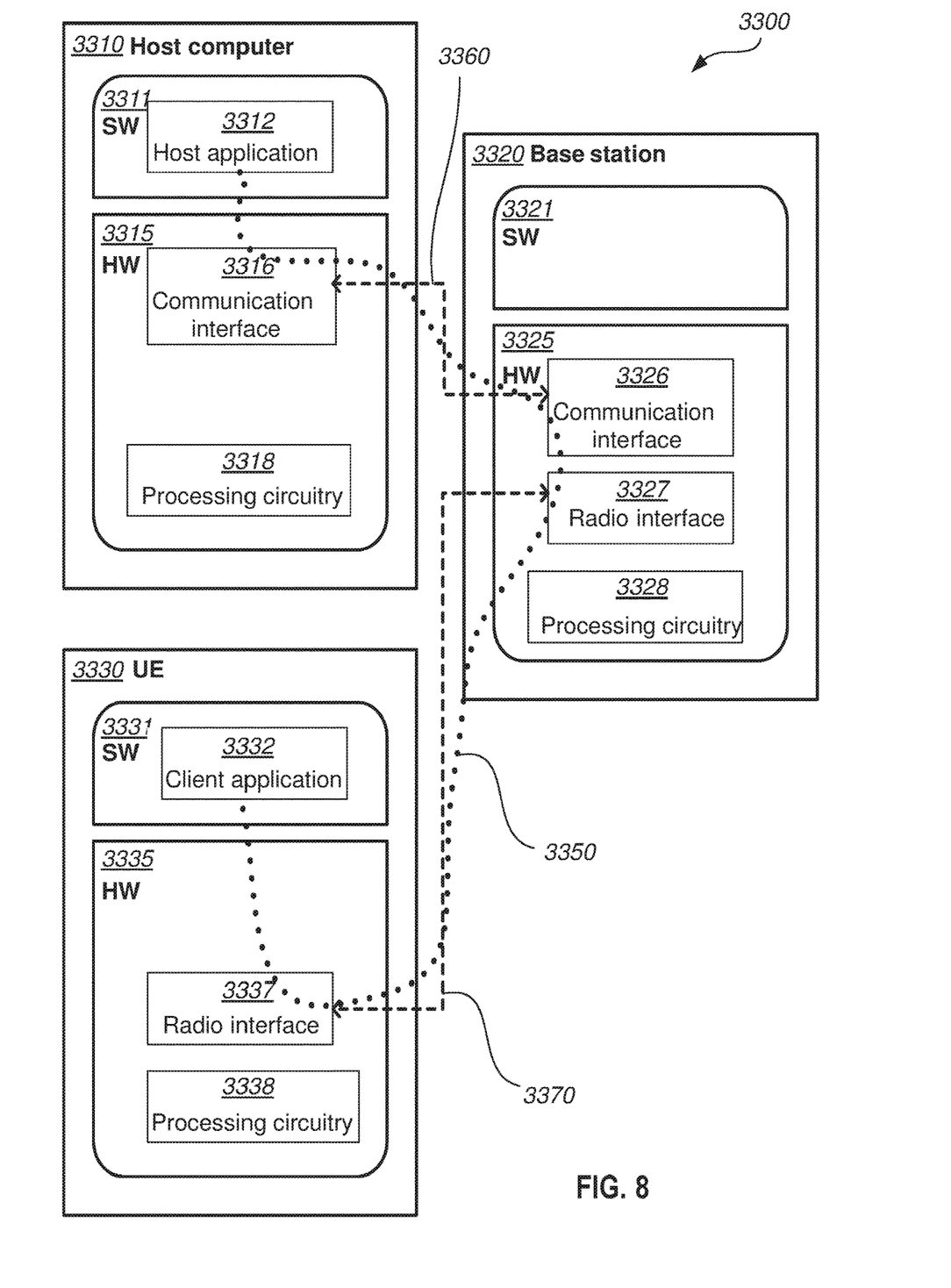
FIG. 8 is a host computer communicating via a base station with a user equipment over a partially wireless connection in accordance with some embodiments.

FIG. 8 shows a host computer communicating via a base station and with a user equipment over a partially wireless connection in accordance with some embodiments Example implementations, in accordance with an embodiment, of the UE, base station and host computer discussed in the preceding paragraphs will now be described with reference to FIG. 8. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 8) served by base station 3320. Communication interface 3326 may be configured to facilitate connection 3360 to host computer 3310. Connection 3360 may be direct or it may pass through a core network (not shown in FIG. 8) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. Its hardware 3333 may include radio interface 3337 configured to set up and maintain wireless connection 3370 with a base station serving a coverage area in which UE 3330 is currently located. Hardware 3333 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

It is noted that host computer 3310, base station 3320 and UE 3330 illustrated in FIG. 8 may be similar or identical to host computer 3230, one of base stations 3212a, 3212b, 3212c and one of UEs 3291, 3292 of FIG. 7, respectively. This is to say, the inner workings of these entities may be as shown in FIG. 8 and independently, the surrounding network topology may be that of FIG. 7.

In FIG. 8, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments make it possible to enhance spatial communication. Embodiments herein may e.g. enable the radio network node to more efficiently control the performance of the UEs by configuring the UEs according to embodiments herein for authentication, and to more efficiently detect pilot sequences.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3333 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Figure 9:
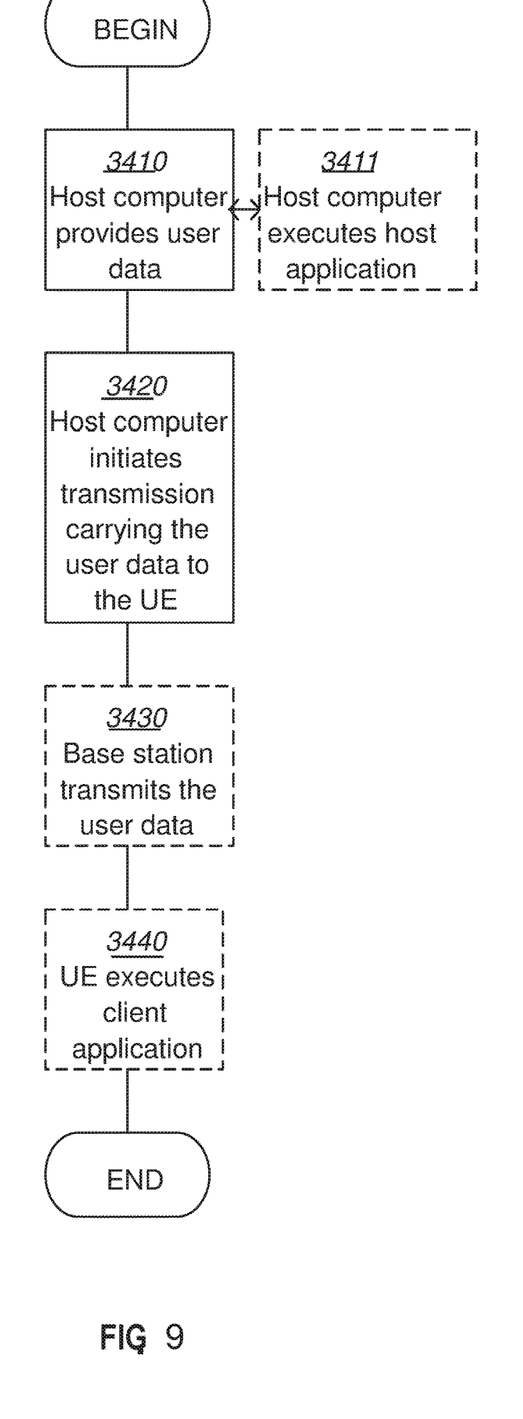
FIG. 9 shows methods implemented in a communication system including a host computer, a base station and a user equipment in accordance with some embodiments.

FIG. 9 shows methods implemented in a communication system including a host computer, a base station and a user equipment in accordance with some embodiments.

FIG. 9 is a flowchart illustrating a method implemented in a communication system, in accordance with one embodiment. The communication system includes a host computer, a base station and a UE which may be those described with reference to FIG. 7 and FIG. 8. For simplicity of the present disclosure, only drawing references to FIG. 9 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

Figure 10:
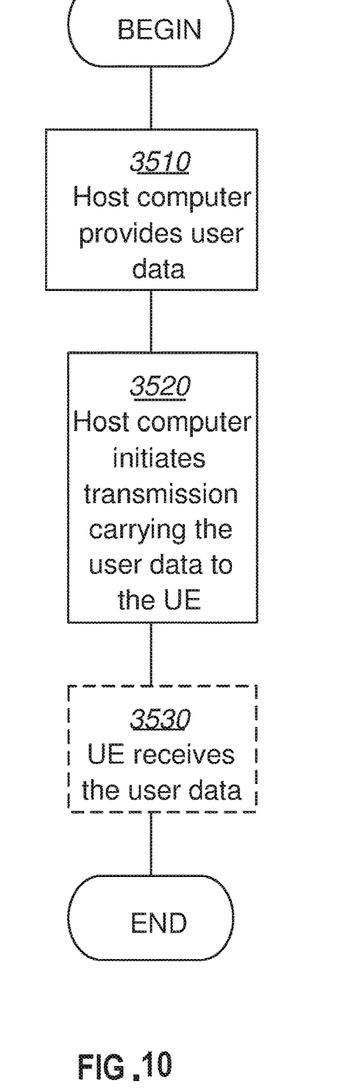
FIG. 10 shows methods implemented in a communication system including a host computer, a base station and a user equipment in accordance with some embodiments.

FIG. 10 shows methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIG. 7 and FIG. 8. For simplicity of the present disclosure, only drawing references to FIG. 10 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

Figure 11:
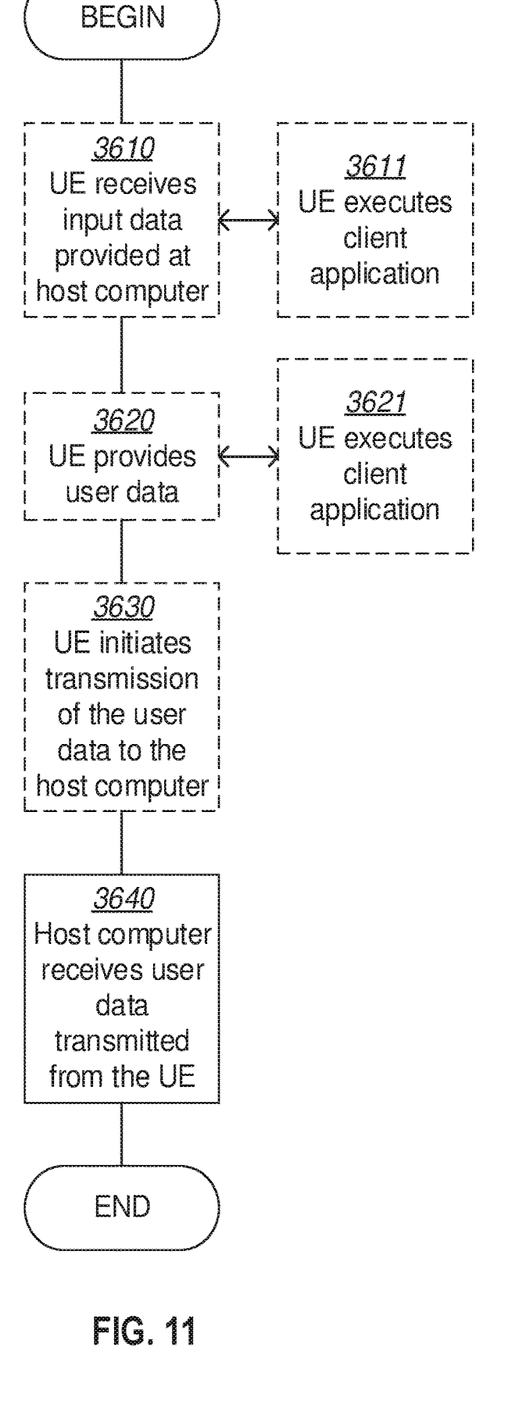
FIG. 11 shows methods implemented in a communication system including a host computer, a base station and a user equipment in accordance with some embodiments.

FIG. 11 shows methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIG. 7 and FIG. 8. For simplicity of the present disclosure, only drawing references to FIG. 11 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

Figure 12:
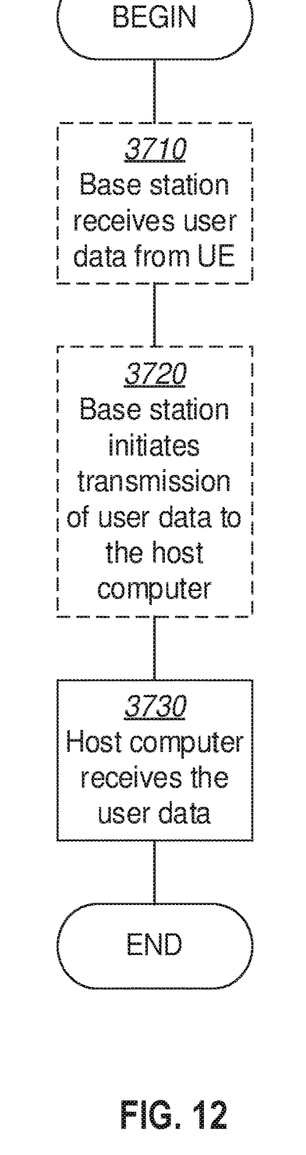
FIG. 12 shows methods implemented in a communication system including a host computer, a base station and a user equipment in accordance with some embodiments.

FIG. 12 show methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIG. 7 and FIG. 8. For simplicity of the present disclosure, only drawing references to FIG. 12 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. An arrangement for handling radio signals, the arrangement comprising:
   a plurality of antenna processing units (APUs) in signal communication via a data bus, each APU being associated with a different beam;
   a plurality of antenna element groups, each antenna element group comprising antenna elements;
   a plurality of beamforming units, each beamforming unit of the plurality of beamforming units being in signal communication with antenna elements of a corresponding one of the plurality of different antenna element groups and configured to steer a plurality of beams associated with the plurality of APUs; and
   each APU of the plurality of APUs being further connected to an antenna element in each antenna element group via a respective beamforming unit.

2. The arrangement according to claim 1, wherein the at least one APU is connected to a first antenna element of a first group of antenna elements and to a second antenna element of a second group of antenna elements, and wherein the first and second two antenna elements have, via respective beamforming unit, at least one of a reception and transmission direction within a similar degree interval set by a threshold.

3. The arrangement according to claim 1, wherein within each group of antenna elements, there are antenna elements configured to at least one of transmit and receive different beams with at least one of different main-lobe directions and polarizations.

4. The arrangement according to claim 1, wherein the beamforming unit of each antenna element group comprises at least one of a butler matrix, a radio frequency lens, and a directing arrangement configured to direct beams.

5. The arrangement according to claim 1, wherein the APU is configured to perform interference cancellation processing locally at the APU.

6. A method performed by an arrangement for handling radio signals, the method comprising:
   associating each antenna processing unit (APU) of a plurality of APUs with a different beam, the plurality of APUs being in signal communication via a data bus;
   steering a plurality of the different beams by a plurality of beamforming units, each beamforming unit of the plurality of beamforming units being in signal communication with antenna elements of a corresponding antenna element group of a plurality of antenna element groups, each APU being further connected to an antenna element in each antenna element group via a respective beamforming unit; and
   one of receiving and transmitting radio signals the antenna elements via the steered plurality of different beams from the plurality of antenna element groups.

7. The method according to claim 6, comprising
   grouping at least two antenna elements of different separated groups of antenna elements based on the communication direction of the antenna elements, wherein grouping comprises identifying the at least two antenna elements.

8. The method according to claim 7, wherein the identifying is one of hard coded and dynamically selected.

9. The method according to claim 6, wherein within each group of antenna elements, there are different beams supported with different at least one of main-lobe directions and polarizations.

10. A non-transitory computer storage medium storing a computer program comprising instructions, which when executed by a processor, causes the processor to perform a method, the method comprising:
    associating each antenna processing unit (APU) of a plurality of APUs with a different beam, the plurality of APUs being in signal communication via a data bus;
    steering a plurality of the different beams by a plurality of beamforming units, each beamforming unit of the plurality of beamforming units being in signal communication with antenna elements of a corresponding antenna element group of a plurality of antenna element groups, each APU being further connected to an antenna element in each antenna element group via a respective beamforming unit; and
    one of receiving and transmitting radio signals over the antenna elements APU via the steered plurality of different beams from the plurality of antenna element groups.

11. The arrangement of claim 1, wherein the plurality of antenna elements are spaced apart in an elongated housing and the data bus is an elongated strip connecting the APUS.

12. The arrangement according to claim 2, wherein within each group of antenna elements, there are antenna elements configured to at least one of transmit and receive different beams with at least one of different main-lobe directions and polarizations.

13. The arrangement according to claim 2, wherein the beamforming unit of each antenna element group comprises at least one of a butler matrix, a radio frequency lens, and a directing arrangement configured to direct beams.

14. The arrangement according to claim 13, wherein the APU is configured to perform interference cancellation processing locally at the APU.

15. The arrangement according to claim 2, wherein the APU is configured to perform interference cancellation processing locally at the APU.

16. The method according to claim 7, wherein within each group of antenna elements, there are different beams supported with different at least one of main-lobe directions and polarizations.

17. The method according to claim 8, wherein within each group of antenna elements, there are different beams supported with different at least one of main-lobe directions and polarizations.

18. The computer storage medium according to claim 10, wherein the method further comprises grouping at least two antenna elements of different separated groups of antenna elements based on the communication direction of the antenna elements, wherein grouping comprises identifying the at least two antenna elements.

19. The computer storage medium according to claim 18, wherein the identifying is one of hard coded and dynamically selected.

20. The computer storage medium according to claim 10, wherein within each group of antenna elements, there are different beams supported with different at least one of main-lobe directions and polarizations.

\* \* \* \* \*